United States Patent Office 2,826,581
Patented Mar. 11, 1958

2,826,581

INHIBITOR REMOVAL FROM VINYL PYRIDINES

John E. Mahan, Stanley D. Turk, and Ralph P. Williams, Bartlesville, Okla., assignors to Phillips Petroleum Company, a corporation of Delaware No Drawing. Application March 14, 1955
Serial No. 494,227

9 Claims. (Cl. 260—290)

This invention relates to the removal of inhibitors from monomeric materials. More specifically this invention relates to the removal of mono- and di-hydroxy substituted aromatic inhibitors from monomeric materials stabilized with said inhibitors. In one of its aspects, this invention relates to the removal of mono- and di-hydroxy substituted aromatic inhibitors from heretocyclic nitrogen containing monomers.

Monomeric materials such as styrene, conjugated dienes, heretocyclic nitrogen containing monomers, acrylic and methacrylic acid monomers and the like are known to polymerize to form elastomers, resins, liquid polymers, etc. depending upon the particular polymerization recipe and conditions. These monomeric materials are known to be more or less active at room temperatures even in the absence of catalyst, activators, etc. Since the monomeric material frequently is prepared at a point remote from the place of polymerization, the monomers must be stabilized for long periods of time, i. e. storage and transportation time. There are many known polymerization inhibitors which have been found to be useful to inhibit polymerization in one or more types of monomeric materials. That is, an inhibitor useful to prevent polymerization of conjugated dienes may be wholly ineffective as a polymerization inhibitor for vinylpyridines or, on the other hand, the inhibitor may be useful for both of the materials but unsatisfactory for other monomeric materials, etc. There are two types of polymerization frequently encountered in the storage of monomers. First, there is the formation of soluble polymers or those polymers which are frequently preferred during the polymerization reaction. The second type of polymerization is frequently referred to as popcorn or proliferous polymerization wherein a highly cross-linked hydrocarbon insoluble polymer is formed. Here again, the success of an inhibitor against one type of polymer formation does not assure the usefulness of the inhibitor against the other type. The art has disclosed many of these inhibitors and has indicated their suitable application and it is not within the scope of this specification to disclose any specific uses for specific inhibitors. Among the inhibitors known to the art, the mono- and dihydroxy substituted aromatic compounds have found wide application. Now before the monomers can be used, the inhibitor must be either removed, inactivated or otherwise counteracted. It is frequently preferred to remove the inhibitor and this is especially true in heretorcyclic nitrogen containing monomers wherein a mono- or dihydroxy substituted aromatic inhibitor has been used since frequently only very small amounts of inhibitor are effective. These inhibitors are frequently removed by distillation but since increasing temperatures increases polymerization activity, this method of separation is generally accompanied by the loss of monomers by polymerization. The distillation of a large volume of monomers is also expensive as compared to the method of this invention.

It is an object of this invention to separate mono- and dihydroxy substituted inhibitors from monomeric materials.

Another object of this invention is to provide a method of separating mono- and dihydroxy substituted inhibitors from heterocyclic nitrogen containing monomers.

Still other objects and advantages of this invention will be obvious to those skilled in the art having been given this disclosure.

According to this invention, mono- and dihydroxy substituted aromatic inhibitors are removed from monomeric material by contacting said monomeric material having said inhibitors incorporated therein with an adsorbent comprising alumina or an inorganic alkali metal salt of alumina.

The method of this invention is applicable for removing the mono- and dihydroxy substituted aromatic inhibitors from monomeric material broadly. While it is not within the scope of the invention to teach which inhibitors are effective to inhibit or retard either normal or proliferous polymerization in which monomers, the following monomeric materials can be mentioned to show the wide application of the invention. Such monomers include carboxy-containing monomers such as acrylic acid; alpha and beta alkyl-substituted derivatives in which the alkyl group contains from one to eight carbon atoms such as methacrylic acid, alpha ethyl-, propyl-, butyl-, amyl-, hexyl-, heptyl-, and octylacrylic acids, phenylacrylic acid, vinylacrylic acids; heterocyclic nitrogen containing monomers such as pyridine and quinoline derivatives containing at least one vinyl or alpha-methylvinyl (isopropenyl) group such as 2-vinylpyridine, 3-vinylpyridine, 4-vinylpyridine, 2,4,6-trimethyl-5-vinylpyridine, 3,4,5,6-tetramethyl-2-vinylpyridine, 3-ethyl-5-vinylpyridine, 2-methyl-5-vinylpyridine, 2,6-diethyl-4-vinylpyridine, 2-isopropyl-4-nonyl-5-vinylpyridine, 2-methyl-5-undecyl-6-vinylpyridine, 3,5-di(alpha-methylvinyl)pyridine, similar mono- and di-substituted alkene, pyridines and like quinolines; styrene, alpha-methyl styrenes and various alkyl substituted styrenes, aminostyrene, alkyl-aminostyrene, dialkylaminostyrene such as 2(N,N-dimethylamino)styrene, 3,4-diethyl-2-amino-styrene, methylethylaminostyrene, dipropylaminostyrene, methylpropylaminostyrene; the corresponding amino-, alkylamino-, and dialkylamino-alpha-methylstyrene; acrylonitrile; methacrylonitrile; acrylates such as methyl acrylate, ethyl acrylate, and methyl methacrylate; amino-, alkylamino-, and dialkylamino- acrylates such as aminoethyl acrylate, methylaminoethyl acrylate, methylethylamino acrylate etc. and the corresponding amino-, alkyl amino-, and dialkylaminomethacrylates; vinyl chloride; vinylidene chloride; vinylacetate; methyl vinyl ketone; methyl isopropenyl ketone; methyl vinyl ether; conjugated dienes such as 1,3-butadiene, isoprene, piperylene, methylpentadiene, 2,3-dimethyl-1,3-butadiene, chloroprene, etc.; various alkoxy such as methoxy and ethoxy and cyano derivatives of conjugated dienes such as 2-methoxybutadiene and 1-cyanobutadiene; vinylcarbazole, vinylpyrrole, vinylmorpholine etc.; and divinyl compounds such as 2,4-divinylpyridine, 2,3-divinylpyridine, 3,5-divinylpyridine, 2,4-divinyl-6-methylpyridine, 2,3-divinyl-5-ethylpyridine, 2,5-divinylquinoline, 2,5-divinyl-6-methylquinoline, 2,4-divinyl-5-ethylquinoline and the like.

The above list of monomers is intended in no way to be exhaustive but merely illustrates the wide variety of monomers to which the method of this invention is applicable.

As has been indicated, the method of this invention is useful for removing those inhibitors which are derivatives of mono- and dihydroxy substituted aromatic compounds from monomeric material. Examples of such compounds which can be separated from monomers by the method of this invention include para-tert-butyl catechol, ortho-amino-phenol, various nitro-substituted phenols such as 2,6-dinitro-4-chlorophenol, 2,4-dinitro-6-chlorophenol, 2,6-dinitro - 3 - chlorophenol, and 2,5-dinitro-4-chlorophenol; 3,4-diaminophenol hydrochloride; aminothiophenol; o-hydroxybenzyl alcohol, alpha naphthol, beta-di-naphthol, p-bromophenol, 5-methyl-1,3-benzenediol, p-phenyl phenol, pentachlorophenol, 2,4,6-tribromophenol, 2,4,6-trichlorophenol, pyrogallol, n-butylpyrogallol, 1,4 - dihydroxyanthraquinone, 2,4 - dihydroxy-acetophenone, resorcinol, phenyl-o-hydroxybenzoic acids, 1,4-dihydroxybenzene, 2-chloro-5-hydroxytoluene, 2 - amino-5-hydroxytoluene, 2,4 - dinitro-1-naphthol, m-aminophenol, p-aminophenol, 2-amino-5-nitrophenol, dibenzyl-p-aminophenol, o-nitrophenol, dinitroresorcinol, and sodium nitroresorcinol.

The above list of compounds are typical of the compounds of the classes of materials taught by the art to be inhibitors. While we do not say that all of these compounds are effective inhibitors, we do say that these compounds when so used can be removed by the process of this invention.

The adsorbent material useful for removing an inhibitor of the class defined comprises alumina, inorganic alkali salts of alumina as the aluminate or mixtures of the two. Alumina commercially available contain at least a finite amount of aluminate and the aluminate can run as high as one or even two percent. In general, the aluminate is present as the sodium or potassium salt. Commercial alumina is frequently prepared from an alumina such as bauxite by caustic washing followed by water washing and the resulting material dried or even calcined. All such commercially prepared aluminas will contain a finite amount of the alkali metal aluminate. While the alumina or aluminate can be of any size, commercially available aluminas are generally in the size range of 10 to 400 mesh and we have found that alumina having a mesh size in a range of 20 to 60 is especially effective.

The number of volumes of inhibited monomers which can be treated by a given volume of a particular adsorbent will be dependent upon the concentration of inhibitors in the monomers and upon the particular inhibitor. That is a larger volume of monomers having a low inhibitor content can be treated than can monomers having a high inhibitor content. Both the alumina and the aluminates are effective inhibitor removers. However, we have found that those mono- and di-hydroxy substituted aromatic inhibitors having no further substitution or further substituted only by hydrocarbons such as tert-butylcatechol (TBC) are removed in greater quantities by the aluminates than by the alumina. That is, a given volume of aluminate will remove inhibitor from a greater volume of monomers containing a given concentration of such inhibitors than will an equal volume of alumina. On the other hand, inhibitors such as ortho-aminophenol (OAP) are as effectively removed by alumina as by the aluminate.

In order to have a rapid method for determining the effectiveness of various adsorbents, a color test using aqueous cupric sulfate as the reagent was developed for detecting o-aminophenol (OAP) in 2-methyl-5-vinylpyridine (MVP). The method developed is as follows:

Three drops of a 2 percent aqueous solution of cupric sulfate is added to one milliliter of MVP sample and the mixture shaken. The presence of OAP is indicated by a brown color which is fully developed in about 15 minutes.

As little as fifty parts per million of OAP in MVP can be detected easily by this test if the Gardner color of the MVP is below 8 or 9, and semi-quantitative estimations are made by visual comparison with standard MVP solutions containing known amounts of OAP. Where both OAP and TBC are present in inhibiting amounts, the presence of the TBC does not interfere with the color test.

The following color test was used for detecting tert-butylcatechol (TBC) or pyrogallol in MVP.

The color reagent is prepared by shaking 0.5 gram of ferric chloride in 50 milliliters of 2-methyl-5-ethylpyridine (MEP). Two drops of this reagent is added to one milliliter of the MVP to be tested. A blue coloring of the solution, produced immediately upon shaking, indicates the presence of TBC or pyrogallol.

As little as 50 parts per million of either of these inhibitors can be readily detected by this test.

As has been indicated, it is particularly desirable to remove inhibitors from MVP prior to use. Inhibitors which are particularly useful for inhibiting MVP are such as o-aminophenol (OAP), tert-butylcatechol (TBC), and dinitro-halogenated phenols such as 2,6-dinitro-4-chlorophenol, etc. All of these inhibitors are especially effective and are undesirable when present in the polymerization recipe. Therefore the separation of these materials from MVP is a preferred embodiment of this invention.

To illustrate the effectiveness of the method of this invention the following examples are presented. These examples are for the purpose of illustration only and are not to be considered limiting in any manner.

EXAMPLE I

Glass columns of 1.2 cms. inside diameter, were packed to a depth of 30 cms. with alumina from various commercial sources. MVP containing 0.07 percent TBC and 0.05 percent (recrystallized) OAP and having color ranging from 3 to 9 on the Gardner varnish scale was percolated through the column in a downward direction and collected in 25 ml. cuts. Each cut was tested for OAP and TBC by the color procedure described. The OAP and the TBC break through points, i. e., the point where OAP or TBC is first detected by the above described color test and the 0.005, 0.01 and 0.025 percent OAP points are given in Table I.

Table I

| Run | Alumina | | | Percolation | | Inhibitor removal capacity, vol. MVP per vol. alumina | | | | |
|---|---|---|---|---|---|---|---|---|---|---|
| | Type | Mesh | Grams | Cc./min. | Bed, vol./hr. | OAP break through point | .005% OAP point | .01% OAP point | .025% OAP point | TBC break through point |
| 1 | A[1] | 20-60 | 33.3 | 4.5 | 7.96 | 7.4 | 11.8 | 14 | | 7.4 |
| 2 | B | 100-325 | 37.4 | 4.0 | 7.1 | 9.6 | 10.3 | | 11.1 | 10.3 |
| 3 | C | 20-60 | 34.7 | 4.5 | 7.96 | | 2.2 | 2.95 | | 2.2 |
| 4 | D | Powder | 36.7 | 1.9 | 3.36 | 14.8 | | 16.2 | 17.0 | 16.2 |
| 5 | E | 20-60 | 28.6 | 4.6 | 8.15 | 5.9 | 7.4 | 9.6 | | 6.6 |
| 6 | F | 20-60 | 33.4 | 5.0 | 8.85 | 5.9 | 9.6 | 11.8 | 12.5 | 9.6 |

[1] A—"Fisher Scientific Co." Catalogue 7-574 (A-541). (An alumina catalyst). B—"Alcoa" X F-21 alumina. C—Bauxite. D—"Merck" activated aluminum oxide recommended for chromatographic analysis. N₂ pressure required to obtain the desired percolation rate. E—"Alcoa" H-41 alumina. F—"Alcoa" F-1.

All of the alumina except run 5 were dried at 400° F. overnight prior to use. The alumina in run 5 was not so dried.

EXAMPLE II

In this example MVP containing 0.07 percent TBC and 0.05 percent OAP and having a color ranging from 3 to 9 on the Gardner varnish scale was percolated through columns as described in Example I wherein the columns were packed to a depth of 30 cms. with various adsorbents. Again each cut was tested for inhibitor removal and it was found that each of these materials tested other than alumina or inorganic alkali aluminates were ineffective. Table II lists the materials found ineffective for removal of these inhibitors from MVP.

Table II

Materials showing no appreciable adsorption of o-aminophenol or tert-butylcatechol from MVP:

|    | Absorbent | Mesh |
|----|-----------|------|
| 1  | Decolorizing charcoal | Powder. |
| 2  | Clay | 20-60. |
| 3  | Attapulgus clay | 30-60. |
| 4  | Montmorillonite clay | 20-60. |
| 5  | Permex activated clay | 20-60. |
| 6  | Sinclair clay | 30-60. |
| 7  | Silverton clay | 20-60. |
| 8  | Louisiana bentonite | 20-60. |
| 9  | Talc | Powder. |
| 10 | Calcium carbonate | Granular. |
| 11 | Calcium sulfate | Powder. |
| 12 | Sucrose | Do. |
| 13 | Barium oxide | 20-60. |
| 14 | Calcium oxide | Granular. |
| 15 | Ion exchange resins [1] | |

[1] Several ion exchange resins were tried and found ineffective.

EXAMPLE III

This example is given to illustrate the effect of agitating the adsorbent with the monomer in a batch operation. Fisher "activated alumina" ground to pass 100 mesh screen and ignited was mixed with various amounts of MVP containing 0.05 percent OAP and placed in glass vials which were agitated on a rocker assembly for several hours. Periodically, 1.5 cc. samples were withdrawn from the vials, filtered, and tested for OAP by the color method described. The results of these runs are tabulated below in Table III.

Table III.—o-Aminophenol removal of agitation of MVP with alumina

| Run | Vol. alumina/ cc. | Vol. MVP (cc.) | Vol. MVP/vol. alumina | o-Aminophenol concentration (percent) | | | | |
|-----|-------|-------|-------|--------|--------|--------|--------|--------|
|     |       |       |       | 0.5 hr. | 1 hr. | 2 hr. | 4 hr. | 7 hr. |
| 1   | 7.25  | 42.75 | 5.9   | 0      | 0     | 0     | 0     | 0     |
| 2   | 3.9   | 46.1  | 11.8  | 0.005-0.01 | 0.005 | 0.005 | 0.005 | 0.005 |
| 3   | 2.67  | 47.33 | 17.7  | 0.01-0.025 | 0.01-0.025 | 0.01 | 0.01 | 0.01 |
| 4   | 2.03  | 47.97 | 23.6  | 0.025  | 0.025 | 0.025 | 0.025 | 0.025 |
| 5   | 1.64  | 48.36 | 29.5  | 0.025-0.05 | 0.025 | 0.025 | 0.025 | 0.025 |

EXAMPLE IV

This example is presented to show the effect of aluminate content on the removal of TBC.

43.8 grams of activated alumina was suspended in 3.2 percent aqueous solution of sodium hydroxide. After shaking this suspension for five minutes, the alumina was allowed to settle and the excess solution decanted. Subsequent ignition (calcination) in an evaporating dish heated by a gas burner produced an alumina containing a theoretical 5.26 percent of sodium aluminate. This caustic treated alumina was tested for efficiency in removing inhibitor from inhibited MVP by percolating MVP containing 0.07 percent by weight of tert-butyl catechol downward through glass column packed with treated alumina. The MVP was collected in 25 ml. cuts and tested for TBC by the color test previously described. Table IV shows a comparison of TBC removal with a control alumina and with the caustic treated alumina.

Table IV

| Run | Volume MVP per volume alumina | Percent TBC in sample after contact with alumina | Absorbent mesh | Weight absorbent | Percolation rate (bed volumes per hours) | Inhibitor removal capacity, vol. MVP/vol. Al at breakthrough point |
|-----|-------|-------|-------|-------|-------|-------|
| Control | 46.2 | 0.035-0.07 | 20-60 | 13.0 | 7.1 | 15.4 |
|         | 30.8 | 0.014 | | | | |
|         | 11.5 | 0.0 | | | | |
| Control treated with NaOH | 46.2 | 0-0.005 | 20-60 | 12.1 | 7.1 | 34.6 |
|         | 30.8 | 0.0 | | | | |
|         | 11.5 | 0.0 | | | | |

The caustic treated alumina showed no improvement in removal of OAP over the untreated alumina.

EXAMPLE V

This example is presented to show that sodium aluminate is an effective inhibitor removal agent.

MVP inhibited with 0.1 weight percent TBC and 0.025 weight percent OAP was percolated through a sodium aluminate catalyst material. This treatment effectively removed both of these inhibitors.

EXAMPLE VI

This example is presented to show the effect of removing TBC and OAP from a monomeric material other than MVP. Styrene inhibited with TBC and OAP was percolated through a column containing alumina. The inhibitor removal was comparable to that of inhibitor removal from MVP.

We claim:

1. A method of treating a vinylpyridine containing inhibiting amounts of an inhibitor selected from the group consisting of monohydroxy and dihydroxy substituted aromatic organic compounds to reduce the concentration of said inhibiting compound in said monomer, the said process comprising percolating said vinylpyridine containing said inihibitor through an adsorbent having a particle size in the range of 20 to 60 mesh and comprising a compound of aluminum selected from the group consisting of refined alumina containing alkali metal aluminate and alkali metal aluminates.

2. The method of claim 1 wherein the monomeric material is 2-methyl-5-vinylpyridine.

3. The method of claim 2 wherein the inhibiting compound is tert-butylcatechol and the adsorbent comprises sodium aluminate.

4. The method of claim 2 wherein the inhibiting compound is ortho-aminophenol and the adsorbent comprises refined alumina containing alkali metal aluminate.

5. The method of claim 2 wherein the inhibiting compound is pyrogallol and the adsorbent comprises refined alumina containing alkali metal aluminate.

6. A method of removing monohydroxy and dihydroxy substituted aromatic compounds incorporated in polymerizable vinylpyridines, said method comprising contacting the admixture of monomers and substituted aromatic compound with an adsorbent, said adsorbent comprising a compound of aluminum selected from the group consisting of refined alumina containing alkali metal aluminate and alkali metal aluminates.

7. A method of treating polymerizable vinylpyridines containing inhibiting amounts of a compound selected from the group consisting of monohydroxy and dihydroxy substituted aromatic organic compounds to reduce the concentration of said inhibiting compound in said monomers, said method comprising contacting said monomers with an adsorbent having a particle size in the range of 10 to 400 mesh and comprising a compound of aluminum selected from the group consisting of refined alumina containing alkali metal aluminate and alkali metal aluminates.

8. The process of claim 7 wherein said compound of aluminum is sodium aluminate.

9. The process of claim 7 wherein said compound of aluminum is potassium aluminate.

References Cited in the file of this patent

UNITED STATES PATENTS

| | | |
|---|---|---|
| 2,327,526 | Jones et al. | Aug. 24, 1943 |
| 2,331,244 | Strickland | Oct. 5, 1943 |
| 2,375,596 | Strickland | May 8, 1945 |

OTHER REFERENCES

Siegert: Chem. Abst., vol. 35, col. 7663 (1941).